(12) United States Patent
Van Auken (10) Patent No.: US 6,577,110 B2
(45) Date of Patent: Jun. 10, 2003

(54) DC-TO-DC CONVERTER WITH CONSTANT RIPPLE CURRENT REGULATION FOR CONTINUOUS AND DISCONTINUOUS CONDUCTION MODE OPERATION

(75) Inventor: Jeffrey B. Van Auken, Littleton, MA (US)

(73) Assignee: Sipex Corporation, Milpitas, CA (US)

( * ) Notice: Subject to any disclaimer, the term of this patent is extended or adjusted under 35 U.S.C. 154(b) by 0 days.

(21) Appl. No.: 09/759,064

(22) Filed: Jan. 12, 2001

(65) Prior Publication Data

US 2002/0093320 A1 Jul. 18, 2002

(51) Int. Cl.$^7$ ................................................. G05F 1/40
(52) U.S. Cl. ........................ 323/282; 323/224; 323/225; 323/284
(58) Field of Search ................................ 323/222, 282, 323/283, 284, 285, 351, 224, 225, 350

(56) References Cited

U.S. PATENT DOCUMENTS

| | | | |
|---|---|---|---|
| 5,568,044 A | 10/1996 | Bittner | 323/272 |
| 5,721,483 A | 2/1998 | Kolluri et al. | 323/224 |
| 5,747,976 A | 5/1998 | Wong et al. | 323/282 |
| 5,814,979 A | 9/1998 | Grimm | 323/284 |
| 5,943,227 A | 8/1999 | Bryson et al. | 363/95 |
| 5,949,226 A | 9/1999 | Tanaka et al. | 323/285 |
| 5,955,872 A | 9/1999 | Grimm | 323/283 |
| 5,994,885 A | 11/1999 | Wilcox et al. | 323/285 |
| 5,995,387 A | 11/1999 | Takahashi et al. | 363/21 |
| 6,038,144 A | 3/2000 | Matsumoto et al. | 363/19 |
| 6,147,517 A | 11/2000 | AlNahas et al. | 327/65 |
| 6,307,356 B1 * | 10/2001 | Dwelley | 323/282 |
| 6,396,250 B1 * | 5/2002 | Bridge | 323/283 |
| 6,437,549 B1 * | 8/2002 | Takagishi | 323/282 |

OTHER PUBLICATIONS

Rogers, Everett; "Understanding Buck Power Stages in Switchmode Power Supplies", Texas Instruments Mixed Signal Products Application Report, pp. 1–32, Mar. 1999.
"Step–Down SMPS/Buck Converter: Ideal Circuit" <retrieved on Mar. 18, 2000>. Retrieved from the Internet: <URL:http://www.ee.uts.edu.au/~venkat/pe_html/ch0751/ch07s1p1.htm>.
Data Sheet for MAX1626/1627. Maxim Corporation, pp. 1–16, Jun. 1996.
Data Sheet for MAX1692, Maxin Corporation, pp 7–10.
Data Sheet for LTC1474/LTC1475, Linear Technologies, pp. 1–10.

* cited by examiner

Primary Examiner—Michael Sherry
Assistant Examiner—Gary L. Laxton
(74) Attorney, Agent, or Firm—Testa, Hurwitz & Thibeault, LLP (57) ABSTRACT

A circuit and method for powering DC devices using DC voltage sources. The present invention provides an improved switching power supply that has reduced switching losses and prevents current backflow under light load conditions. The circuit operates using pulse-frequency modulation in discontinuous conduction mode for powering small loads. A rectifier circuit prevents current backflows into the DC voltage source to prevent overheating and device failure.

13 Claims, 8 Drawing Sheets

DC-TO-DC CONVERTER WITH CONSTANT RIPPLE CURRENT REGULATION FOR CONTINUOUS AND DISCONTINUOUS CONDUCTION MODE OPERATION

FIELD OF THE INVENTION

The present invention relates generally to switching power supply circuits. In particular, the invention relates to circuits that supply power to loads in continuous conduction mode and discontinuous conduction mode.

BACKGROUND OF THE INVENTION

Portable electronic devices typically require the application of a regulated DC voltage in a predetermined range of voltages for satisfactory operation. Many electronic devices rely on unregulated DC supplies such as lithium-ion batteries as a power source. Batteries generally provide a voltage that is substantially fixed over short time periods but slowly decreases throughout its useful lifetime. Consequently, battery voltage is often transformed to a regulated supply voltage having a different voltage value to ensure proper operation of the electronic device.

The prior art teaches many ways to accomplish this conversion. For example, some portable electronic devices use arrays of capacitors (e.g., charge pumps) to convert the source voltage into a voltage with a different polarity or magnitude. Other devices use switching power supplies to provide a regulated voltage for proper operation. Switching losses inherent in such supplies can limit the power efficiency.

Certain portable electronic devices utilize unregulated DC supplies that are sensitive to current backflow. For example, lithium-ion batteries can experience heating problems or can be damaged if current flows back into the battery. Therefore, it is desirable to provide a switching power supply that prevents current backflow and minimizes switching losses.

SUMMARY OF THE INVENTION

The present invention relates to a circuit and method for powering DC devices using DC voltage sources. The present invention provides an improved switching power supply that has reduced switching losses and prevents load current reversal under light load conditions. The circuit operates using constant ripple current regulation in continuous and discontinuous mode operation. In discontinuous mode, this is accomplished using pulse-frequency mode modulation. A rectifier circuit prevents current backflow into the DC voltage source, which otherwise can cause overheating and device failure.

In one aspect, the invention relates to a circuit for generating a regulated output voltage. In one embodiment, the circuit includes an inductor, a first switch, a pulse generator and a rectifier circuit. The inductor has a first terminal and a second terminal. The first switch has a first terminal to receive a first reference voltage, a second terminal in communication with the first terminal of the inductor, and a control terminal for receiving a first control signal. The pulse generator has an input terminal and an output terminal, which provides the first control signal, in communication with the control terminal of the first switch. The rectifier circuit has a first control input terminal in communication with the output terminal of the pulse generator, a second control input terminal in communication with the second terminal of the second switch and a third control input terminal to receive the second reference voltage.

In one embodiment, the rectifier includes a first comparator, a logic module, and a second switch. The first comparator has a first terminal in communication with the second control input terminal, a second terminal in communication with the third control input terminal, and an output terminal. The logic module has a first input terminal in communication with the first control input terminal, a second input terminal in communication with the output terminal of the first comparator, and an output terminal to provide a second control signal. The second switch has a first terminal to receive a second reference voltage, a second terminal in communication with the first terminal of the inductor, and a control terminal to receive the second control signal. In another embodiment, the second terminal of the first comparator receives a small negative voltage.

In another embodiment, the pulse generator includes an adaptive pulse generator and an OR gate. The adaptive pulse generator has an input terminal in communication with the input terminal of the pulse generator and an output terminal. The OR gate has a first input in communication with the output terminal of the adaptive pulse generator, a second input in communication with the input terminal of the pulse generator, and an output terminal in communication with the output terminal of the pulse generator. In yet another embodiment, the pulse generator also includes a comparator. The comparator has a first terminal in communication with the second terminal of the inductor, a second terminal to receive a third reference voltage, and an output terminal connected with the input terminal of the adaptive pulse generator. In still another embodiment, the pulse generator includes an overcurrent detector having an input terminal connected to the first inductor terminal and an output terminal connected to the first switch control terminal.

In still another embodiment, the logic module includes a flip-flop and a NOR gate. The flip-flop has an input terminal in communication with the output terminal of the first comparator, a reset terminal in communication with the first control input terminal, a data terminal to receive the first reference voltage, and an output terminal. The NOR gate has a first NOR input terminal in communication with the first control input terminal, a second NOR input terminal in communication with the output terminal of the flip-flop, and an output terminal in communication with the control output terminal.

In another embodiment, the second terminal of the second comparator is in communication with the second terminal of the inductor through a voltage divider network. In one embodiment, the voltage divider network includes a first resistor and a second resistor. The first resistor has a first terminal coupled to the second terminal of the second inductor, and a second terminal. The second resistor has a first terminal coupled to the second terminal of the first resistor and a second terminal to receive the second reference voltage.

In another aspect, the present invention relates to a method for generating a regulated output voltage. The method includes the step of applying a first reference voltage to a series combination of an inductor and a load if an elapsed time is less than a predetermined time or if a voltage across a load is less than a first predetermined voltage. A second reference voltage is applied to the series combination of the inductor and the load if the elapsed time is greater than the predetermined time and if the load voltage is not less than the first predetermined voltage. The application of the second reference voltage is terminated if the voltage across the series combination of the inductor and the load exceeds a second predetermined voltage or if the voltage across the load does not exceed the first predetermined voltage.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

In brief overview, the present invention relates to a circuit and method for providing a regulated DC voltage from a DC source. By maintaining a constant magnitude ripple component in the output current in both continuous and discontinuous conduction modes, regardless of the magnitude of the load, the present invention reduces switching losses under light load conditions. Additional functionality prevents current backflow into the DC source under light load conditions.

Figure 1:
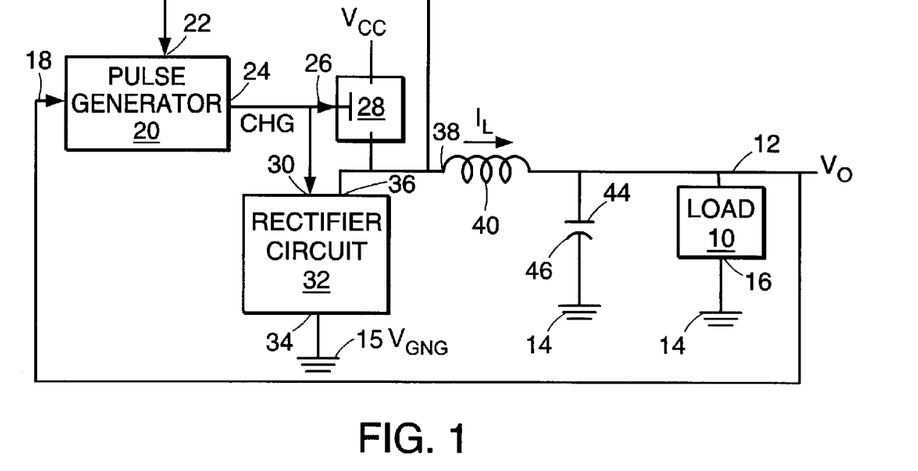
FIG. 1 is a functional block diagram of one embodiment of the circuit of the present invention.

FIG. 1 depicts one embodiment of the circuit of the present invention. The circuit includes a pulse generator 20, a switch 28, a rectifier circuit 32, an inductor 40, and a capacitor 46. In one embodiment, the switch 28 is a field-effect transistor (FET). The circuit is designed to deliver regulated DC power to a load 10 having one terminal 12 connected to capacitor terminal 44 and a second terminal 16 connected to ground 14.

Figure 1A:
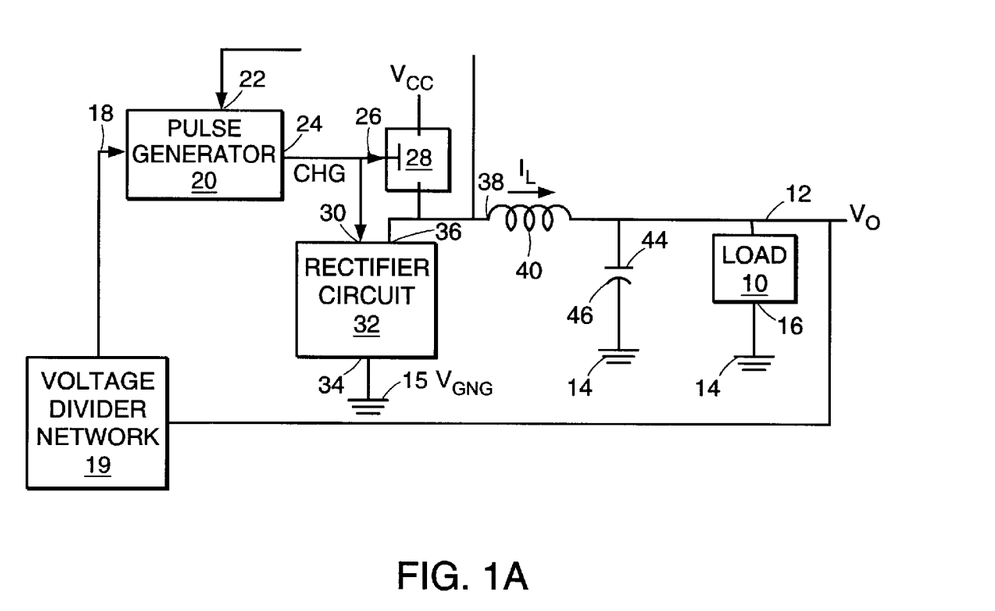
FIG. 1A is a functional block diagram of another embodiment of the circuit of the present invention.

The load voltage $V_o$ is applied to terminal 18 of pulse generator 20. In one embodiment, illustrated in FIG. 1A, the load voltage $V_o$ is applied to terminal 18 through a voltage divider network 19. The voltage divider network 19 provides a proportionately-scaled voltage representative of the voltage $V_o$. The pulse generator 20 compares the voltage $V_o$ to the predetermined reference voltage and generates a signal CHG indicative of whether the voltage across load 10 is less than the reference voltage. This variable pulse width signal CHG is asserted (e.g., changed to a logical HIGH or logical 1 state) at pulse generator output terminal 24 for at least a predetermined time period. If the voltage $V_o$ across load 10 fails to reach the predetermined reference voltage in the predetermined time period, then the pulse generator 20 maintains the variable pulse width signal CHG in the asserted state. The variable pulse width signal CHG is deasserted when excessive current is detected in the inductor, or when the predetermined time period has elapsed and the voltage $V_o$ has increased to the reference value.

The variable pulse width signal CHG is applied to switch terminal 26 to control closure of switch 28 and, therefore, application of DC supply voltage $V_{cc}$ to the inductor terminal 38. A change in the magnitude of the current $I_L$ flowing through inductor 40 occurs when the switch 28 is closed. Thus, energy is stored in the inductor 40 and the voltage $V_0$ across load 10 increases. If the load voltage $V_0$ increases to match the value of the reference voltage and if the predetermined time period has expired, then the pulse generator 20 deasserts the variable pulse width signal CHG, thereby opening switch 28. Until both conditions are satisfied, the pulse generator 20 continues to assert the variable pulse width signal CHG.

When the variable pulse width signal opens switch 28, the rectifier circuit 32 couples the first inductor terminal 38 to $V_{GNG}$ 15, a ground or negative voltage, at substantially the same time. As inductor 50 discharges, the inductor current IL decreases in magnitude and capacitor 46 releases its stored charge and provides current to load 10. At first, the current provided by capacitor 46 maintains the voltage $V_o$ across load 10 near the reference voltage. When the inductor current $I_L$ and the charge in capacitor 46 sufficiently decrease, the load voltage $V_o$ drops below the reference voltage value. Consequently, the pulse generator 26 initiates a new charging cycle to maintain the load voltage $V_o$ in regulation.

As long as the average load current is greater than one half of the ripple component of the load current, then the current flow $I_L$ through the inductor 40 remains positive. This mode of operation is referred to as continuous conduction mode (CCM) because there is an uninterrupted current flowing through the inductor 40. A complementary operating mode, referred to as discontinuous conduction mode (DCM), occurs if the current through the inductor 40 decreases to zero for a finite time during operation, such as during sleep mode. During sleep mode, only a small average current is required to maintain the load voltage $V_0$ in regulation. As a result, the magnitude of the ripple component of the load current exceeds the average value of the inductor current $I_L$. Thus, the current $I_L$ through the inductor 40 reverses direction during part of the discharge period. To avoid this backflow current that can damage some DC sources, the rectifier circuit 32 interrupts the current path to the inductor 40 shortly before reversal of the inductor current $I_L$ can occur. Interrupting the current path allows capacitor 46 to discharge directly into load 10, maintaining the load voltage $V_0$ in regulation. This mode of operation is referred to as discontinuous conduction mode (DCM) because the current flow through the inductor 40 is discontinuous.

Figure 2:
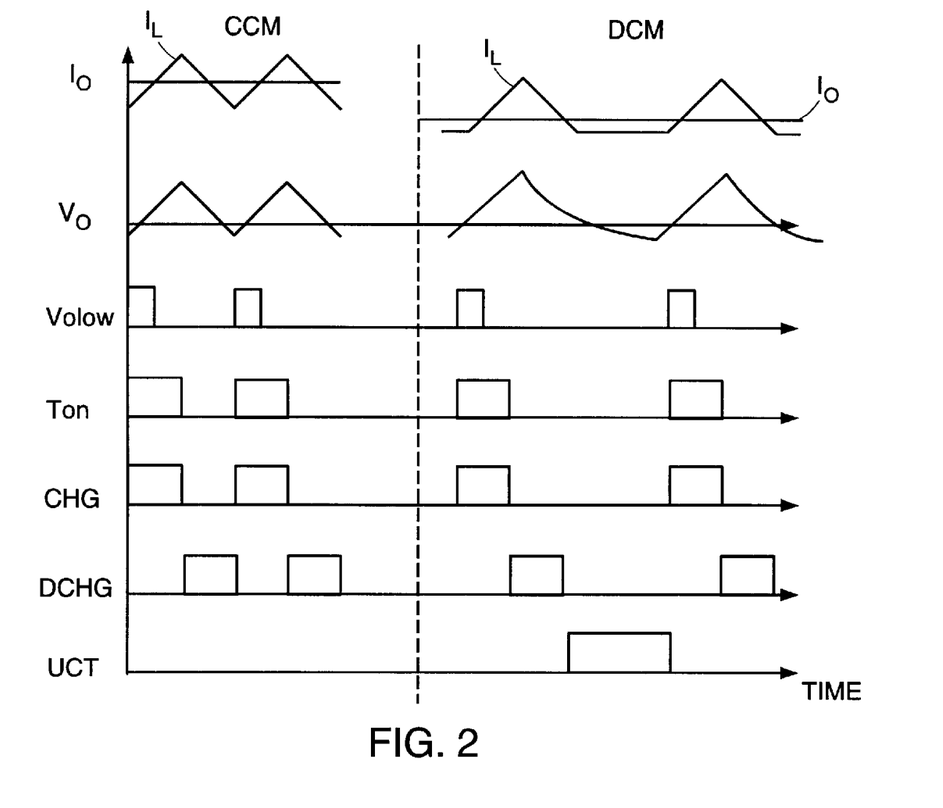
FIG. 2 is a chart of sample waveforms produced during the operation of the circuit of FIG. 1.

FIG. 2 illustrates the current and voltage waveforms of the circuit of FIG. 1. The waveforms on the left depict the circuit powering a load in CCM operation. The waveforms on the right depict the circuit in DCM operation. $I_L$ depicts the current flowing through inductor 40. During CCM operation, the inductor current IL exhibits a ripple about an average current value $I_o$. $V_0$ represents the value of the voltage across the load 10. During DCM operation, the inductor current $I_L$ includes periods during which its magnitude is zero. $V_{olow}$ represents the result of the comparison of the magnitude of the load voltage $V_o$ and the predetermined reference voltage. During CCM operation, $V_{olow}$ is true (logic HI or logic 1) when the load voltage $V_o$ is less than the predetermined reference voltage. $T_{on}$ represents a signal having a substantially fixed predetermined duration that is generated in the pulse generator 20. CHG represents the variable pulse width signal provided at the pulse generator output terminal 24 that maintains switch 28 closed during its asserted state. CHG is asserted for at least the predetermined minimum period, and can remain asserted for a longer period if necessary to increase the load voltage $V_o$ to the predetermined reference voltage. DCHG represents a signal generated within the rectifier circuit 32 that is used to control the coupling of the first inductor terminal 38 to $V_{GNG}$ 15. UCT represents a signal generated within the rectifier circuit 32 that is used to terminate the coupling of the first inductor terminal 38 to $V_{GNG}$ 15. Initiation of the asserted state for signal UCT occurs when the inductor current $I_L$ decreases to near zero to avoid current reversal.

Figure 3:
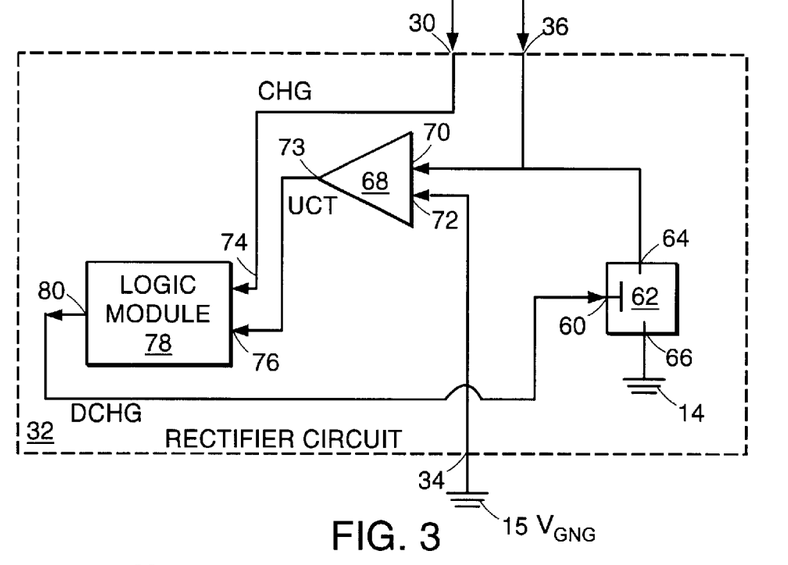
FIG. 3 is a block diagram of an embodiment of the rectifier circuit of FIG. 1.

FIG. 3 depicts one embodiment of the rectifier circuit 32 of FIG. 1. The rectifier circuit 32 includes a switch 62, a comparator 68, and a logic module 78. The switch 62 includes a first terminal 64 in communication with input terminal 36 of the rectifier circuit 32, a second terminal 66 connected to ground 14, and a control terminal 60. The comparator 68 has one input terminal 70 connected to rectifier terminal 36 and a second input terminal 72 connected to rectifier terminal 34. By comparing the voltages at the comparator input terminals 70 and 72, the polarity f the inductor current $I_L$ is determined and is represented by a signal generated at the output terminal 73 of the comparator 68. The logic module has one input terminal 74 connected to input terminal 30 of the rectifier circuit, a second input terminal 76 connected to the comparator output terminal 73 and an output terminal 80 in communication with the control terminal 60 of switch 62. The logic module 78 generates a signal DCHG at its output terminal 80 for controlling switch 62 in response to the output signal CHG from the pulse generator 20 and the output signal UCT from the comparator 68. During CCM operation, control signal DCHG is substantially complementary to the pulse generator output signal CHG. During DCM operation, the combination of control signal DCHG and signal UCT is complementary with the output signal CHG.

Figure 4:
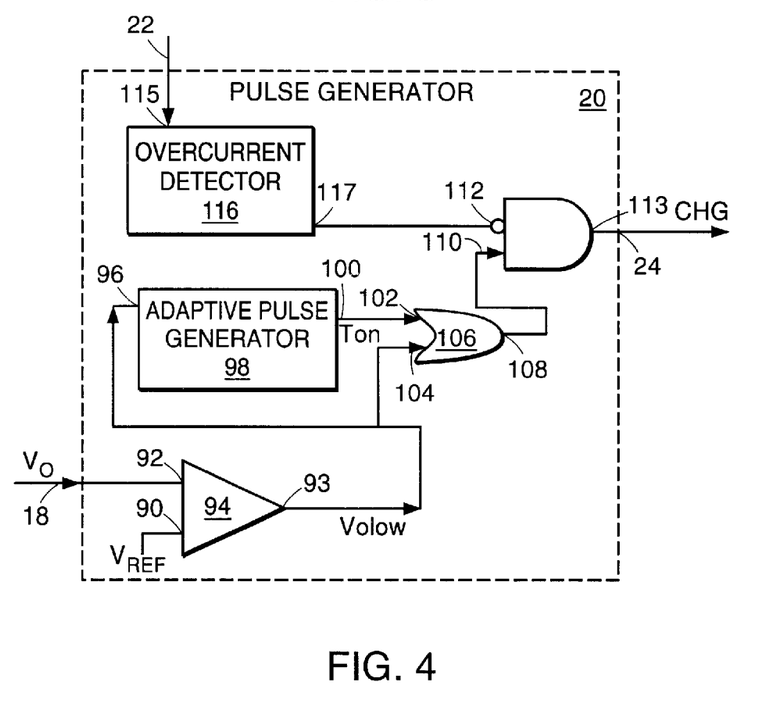
FIG. 4 is a block diagram of an embodiment of the pulse generator of FIG. 1.

FIG. 4 depicts one embodiment of the pulse generator 20 of FIG. 1. The pulse generator 20 includes a comparator 94, an adaptive pulse generator 98, an OR gate 106, an AND gate 114 and an overcurrent detector 116. The comparator 94 has an input terminal 90 to receive a reference voltage $V_{REF}$, a second input terminal 92 in communication with input terminal 18 of the pulse generator 20, and an output terminal 93. The adaptive pulse generator 98 has an input terminal 96 in communication with the output terminal of comparator 94. The OR gate 106 has an input terminal 102 in communication with output terminal 100 of the adaptive pulse generator 98, a second input terminal 104 in communication with comparator output terminal 93, and an output terminal 108. The AND gate 114 has a first input terminal 110 in communication with OR gate output terminal 108, a second complemented input terminal 112 and an output terminal 113 connected to terminal 24 of the pulse generator 20. The overcurrent detector 116 has an input terminal 115 connected to input terminal 22 of the pulse generator 20 and an output terminal 117 connected to the complemented input terminal 112 of the AND gate 114.

In operation, comparator terminal 90 receives a reference voltage $V_{REF}$ representative of a desired load voltage $V_0$ during regulated operation and comparator terminal 92 receives a voltage representative of the instantaneous load voltage $V_0$. The comparator 94 generates a signal at its output terminal 93 indicating whether the load voltage $V_0$ is less than the reference voltage $V_{REF}$. In one embodiment, a proportionately-scaled voltage representative of the load voltage $V_0$ is applied to comparator terminal 92 from a voltage divider network (not shown) coupled to load terminal 12 and comparator terminal 92.

Comparator 94 provides an output signal $V_{olow}$ to the adaptive pulse generator input terminal 96 and OR gate input terminal 104. If $V_{olow}$ indicates that the load voltage $V_0$ is less than reference voltage $V_{REF}$, the adaptive pulse generator 98 asserts a signal at its output terminal 100 for a predetermined minimum time. The OR gate 106 provides an asserted signal at output terminal 108 if at least one of the signals applied to its input terminals 102 and 104 is asserted. Thus, OR gate 106 continues to assert a logical HI or logical 1 signal at terminal 108 beyond the predetermined minimum time if the comparator output signal $V_{olow}$ indicates that load voltage $V_0$ is still less than the desired voltage $V_{REF}$.

The output signal from OR gate 106 is applied to AND gate input terminal 110. The output of overcurrent detector 116 is applied to complemented AND gate input terminal 112. When there is no excess inductor current $I_L$, the output signal from overcurrent detector 116 is low. Consequently, the signal CHG generated by AND gate 114 is determined by the output signal from the OR gate 106. If the inductor current $I_L$ increases to an unacceptable level, the output signal from the overcurrent detector 116 is asserted. As a result, the pulse generator output signal CHG is deasserted or held low to reduce the inductor current $I_L$.

Figure 5:
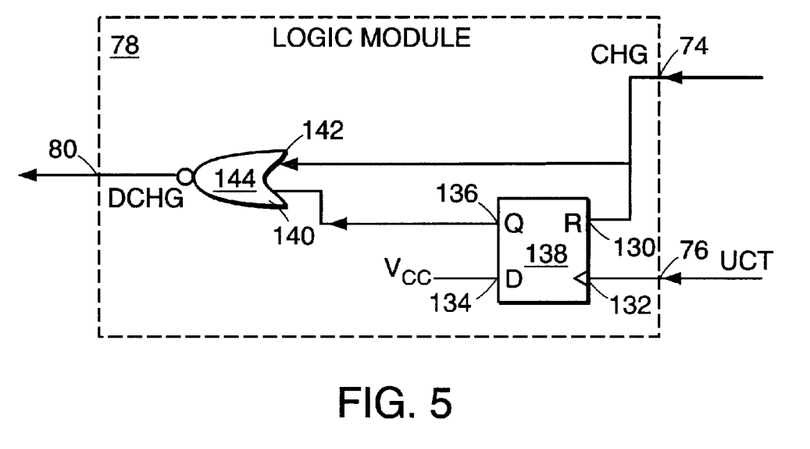
FIG. 5 is a block diagram of an embodiment of the logic module of FIG. 3.

FIG. 5 depicts an embodiment of the logic module 78 of FIG. 3. The logic module 78 includes an edge-triggered D flip-flop 138 and a NOR gate 144. The D flip-flop 138 has an input terminal 132 in communication with logic module input terminal 76, a reset terminal R 130 in communication with logic module input terminal 74, a data terminal D 134 adapted to receive a reference voltage $V_{cc}$ and an output terminal Q 136. The NOR gate 144 has one input terminal 142 in communication with logic module input terminal 74, a second input terminal 140 in communication with the output terminal 136 of the D flip-flop 138, and an output terminal 143 in electrical communication with logic module output terminal 80.

In CCM operation, while inductor 40 is charging, the asserted output signal CHG from the pulse generator 20 resets the flip-flop 138 so that terminal Q 136 is set low. Consequently, the output signal DCHG from NOR gate 144 is low and switch 62 is maintained in an open state. When output voltage $V_0$ is greater than the desired load voltage represented by $V_{REF}$ and the minimum time on has expired, the output signal CHG from the pulse generator 20 is deasserted and the output signal DCHG is asserted.

In DCM operation during the discharge period, the signal UCT received at input terminal 76 is asserted when the inductor current $I_L$ decreases to zero (or a small positive value). Consequently, the signal at the output terminal Q 136 of the flip-flop 138 is asserted and the output signal DCHG of the logic module is deasserted. Switch 62 is thereby open for the remainder of the discharge period.

Figure 6:
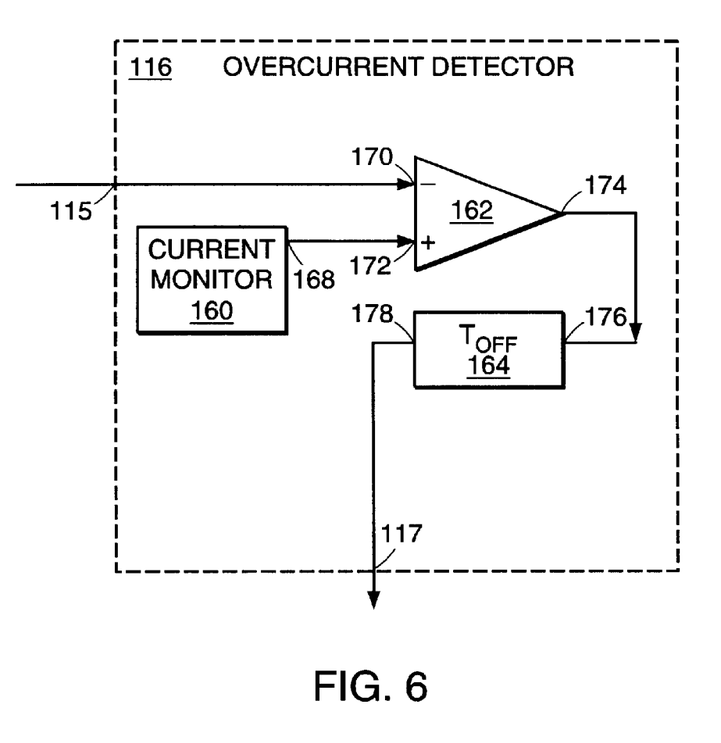
FIG. 6 is a schematic diagram of the overcurrent detector of FIG. 4.

FIG. 6 depicts one embodiment of the overcurrent detector 116 of FIG. 4. The overcurrent detector 116 includes a current monitor 160, a comparator 162, and a pulse generator 164. The current monitor has an output terminal 168. The comparator 162 has a first input terminal 170 connected to overcurrent detector input terminal 115, a second input terminal 172 connected to current monitor output terminal 168, and an output terminal 174. Pulse generator 164 has an input terminal 176 connected to comparator output terminal 174 and an output terminal 178 connected to complemented AND gate input terminal 112.

The current monitor 160 applies a reference voltage at comparator terminal 172 representative of the maximum current density allowable through switch 28. Comparator terminal 170 receives the voltage at inductor terminal 38. When the voltage at terminal 170 decreases so that it equals the voltage representative of the maximum allowable current density while the inductor 40 is charging, the output signal of comparator 162 is asserted at output terminal 174. Pulse generator 164 receives the comparator output signal and consequently generates a logical HIGH pulse of a predetermined minimum time at overcurrent detector output terminal 117 to indicate excess inductor current $I_L$.

Figure 6A:
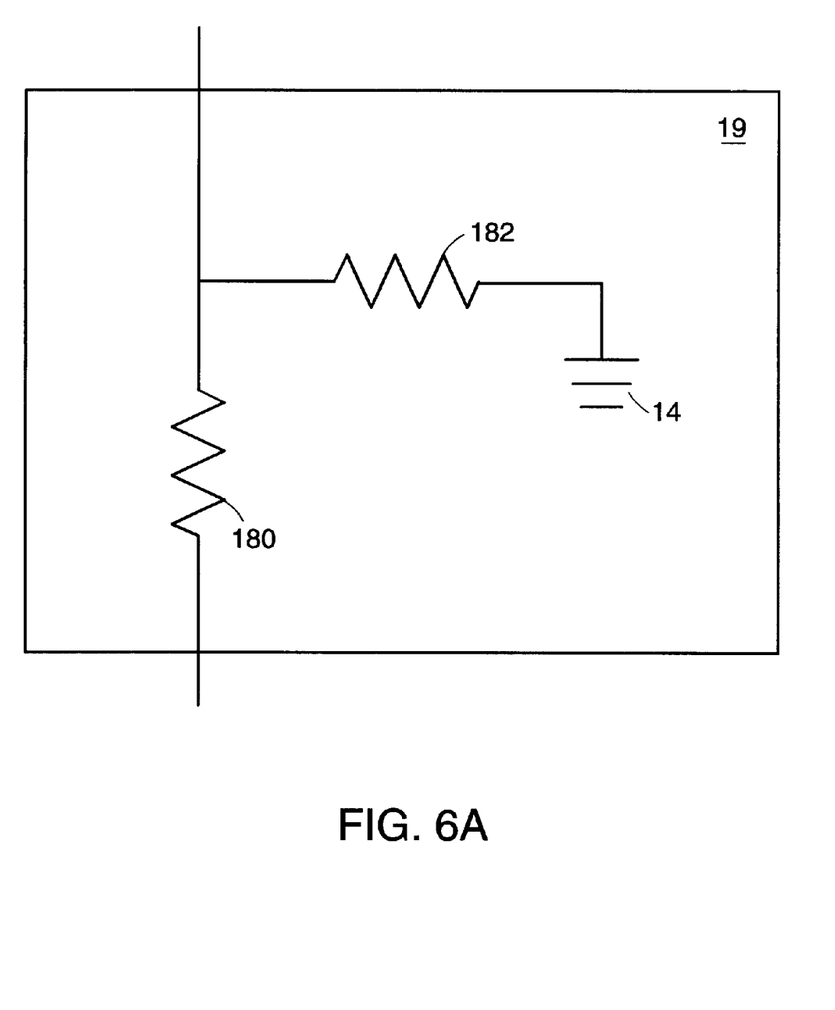
FIG. 6A is a schematic diagram of one embodiment of voltage divider network 19.

FIG. 6A is a schematic diagram of one embodiment of voltage divider network 19. In this embodiment, voltage divider network 19 includes a first resistor 180 having a first terminal electrically coupled to the second terminal of the inductor 40 and a second terminal. The voltage divider network 19 also includes a second resistor 182 having a first terminal electrically coupled to the second terminal of the first resistor 180 and a second terminal adapted to receive a second reference voltage.

Figures 7, 7A:
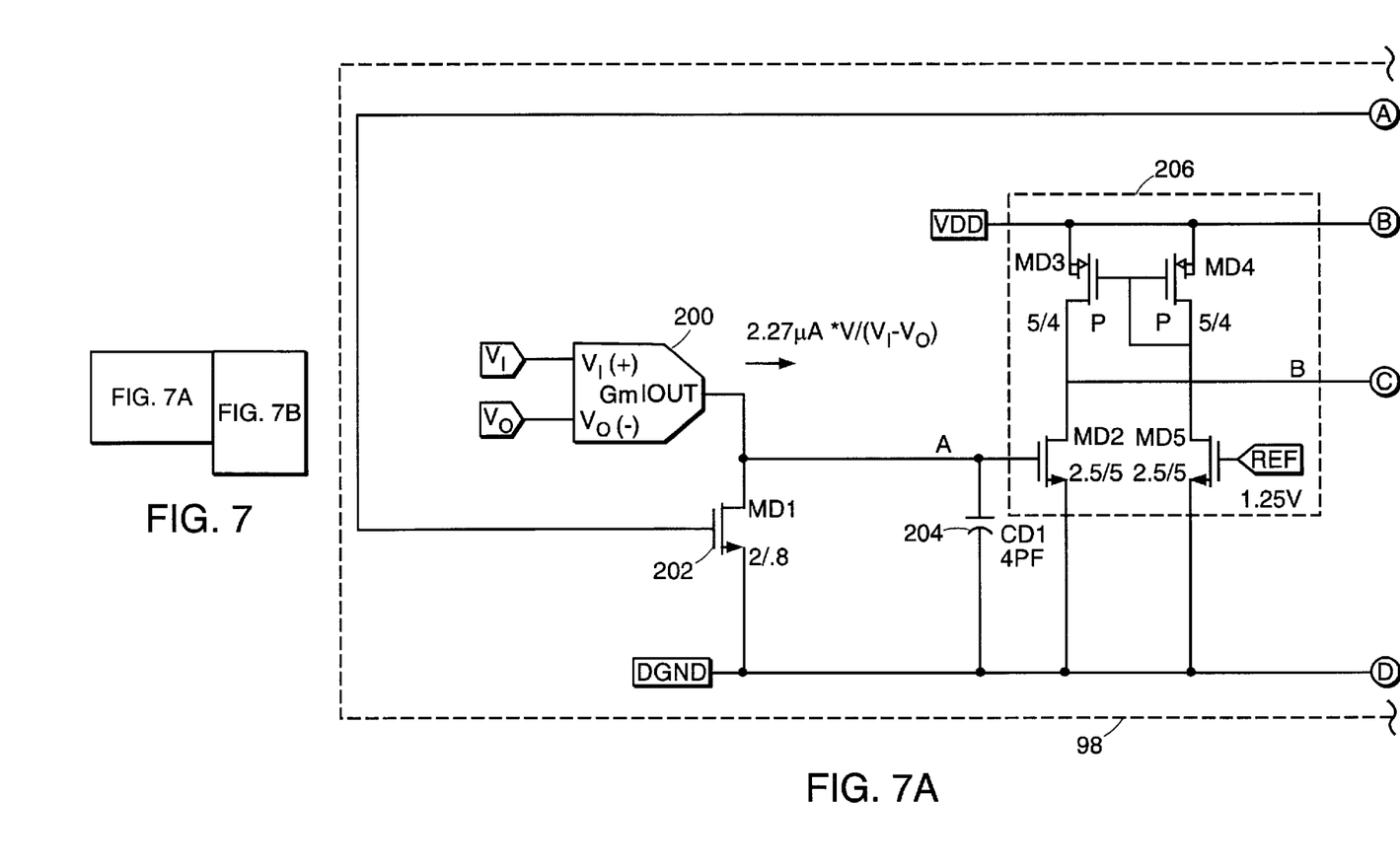
FIG. 7 is a schematic diagram of the adaptive pulse generator of FIG. 4.
Figure 7B:
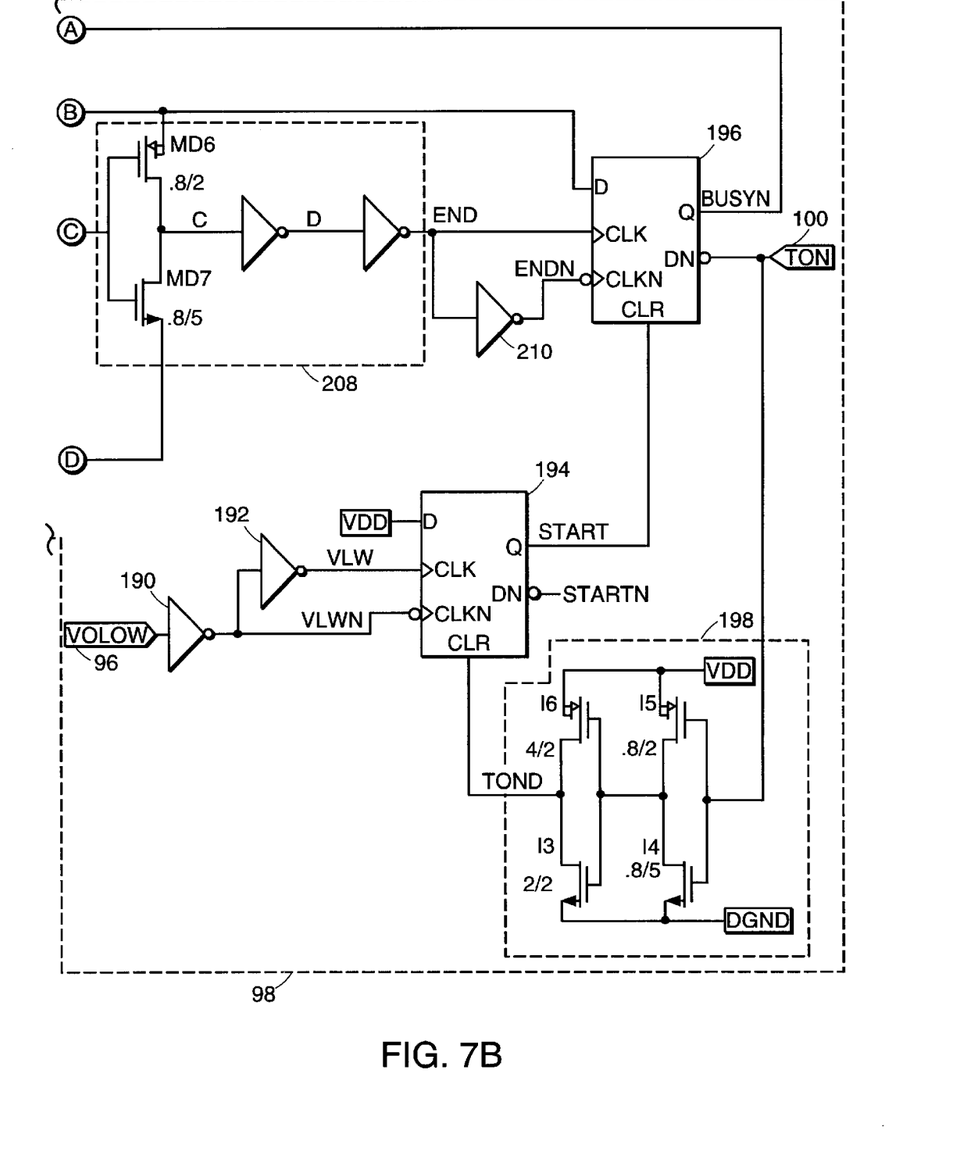

FIG. 7 depicts one embodiment of the adaptive pulse generator of FIG. 4. The adaptive pulse generator 98 includes a first inverter 190, a second inverter 192, a first D flip-flop 194, a second D flip-flop 196, a delay module 198, a current source 200, a transistor 202, a capacitor 204, a current mirror 206, an inverter 208, and an inverter 210. As signal $V_{olow}$ is asserted, inverters 190 and 192 provide triggers to the first flip-flop 194, thereby asserting its START signal output. Flip-flop 196 is cleared, asserting the adaptive pulse generator output signal $T_{on}$ and causing the BUSYN signal output to be deasserted. Deasserting BUSYN opens switch 202, allowing current source 200 to charge capacitor 204. After sufficient charging of the capacitor 204, current mirror 206 is activated so that inverters 208 and 210 trigger flip-flop 196 such that adaptive pulse generator output signal $T_{on}$ is deasserted.

Figure 8:
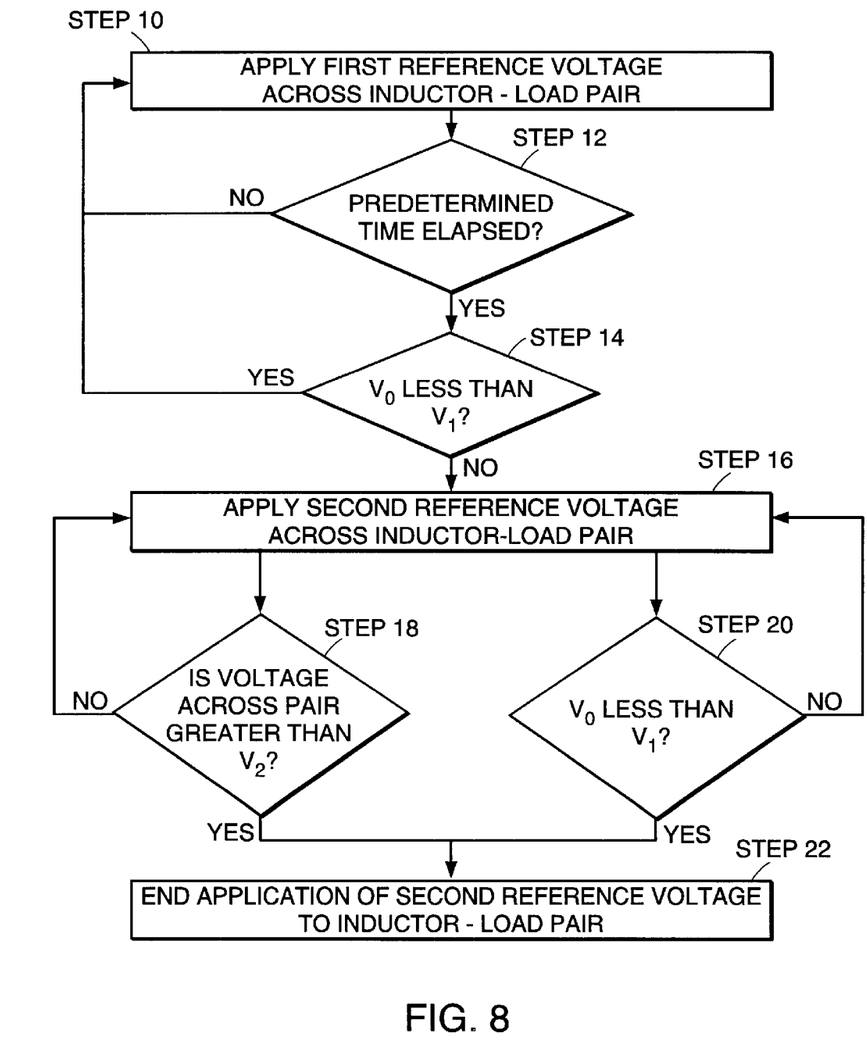
FIG. 8 is a flowchart representation of one embodiment of the method of the present invention.

FIG. 8 is a flowchart representation of a method for generating a regulated output voltage in accord with the present invention. A first reference voltage is applied across a series combination of an inductor and a load (Step 10). If a predetermined time T has elapsed (Step 12) and the voltage $V_O$ across the load is not less than a first predetermined voltage $V_1$ (Step 14), then a second reference voltage is applied across the series combination of the inductor and the load (Step 16). In one embodiment, the second reference voltage is ground. Application of the second voltage is terminated (Step 22) if the voltage across the series combination of the inductor and the load exceeds a second predetermined voltage (Step 18) or if the voltage $V_O$ across the load decreases to less than the first predetermined voltage (Step 20). In one embodiment, the second predetermined voltage is equal to the second reference voltage. In another embodiment, the method includes the additional step of terminating the application of the first reference voltage if the inductor current exceeds a predetermined current limit.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A circuit for generating a regulated output voltage comprising:
    an inductor having a first terminal and a second terminal;
    a first switch having a first terminal adapted to receive a first reference voltage, a second terminal in electrical communication with said first terminal of said inductor, and a control terminal for receiving a first pulse frequency modulated (PFM) control signal;
    a pulse generator having an output terminal in electrical communication with said control terminal of said first switch and an input terminal, said pulse generator providing said first PFM control signal at said output terminal, said first PFM control signal utilizing pulses having a logical HIGH value for a predetermined duration and separated by a logical LOW value of varying duration; and
    a rectifier circuit having a first control input terminal in electrical communication with said output terminal of said pulse generator, a second control input terminal in electrical communication with said second terminal of said first switch, and a third control input terminal adapted to receive a second reference voltage, said rectifier circuit applying said second reference voltage to said first inductor terminal in response to said first PFM control signal and a voltage difference between said second and third control input terminals of said rectifier circuit.

2. The circuit of claim 1 wherein said rectifier circuit comprises:
    a first comparator having a first terminal in electrical communication with said second control input terminal, a second terminal in electrical communication with said third control input terminal, and an output terminal; and
    a logic module having a first input terminal in electrical communication with said first control input terminal, a second input terminal in electrical communication with said output terminal of said first comparator, and a control output terminal for providing a second control signal; and
    a second switch having a first terminal adapted to receive a second reference voltage, a second terminal in electrical communication with said first terminal of said inductor, and a control terminal in electrical communication with said control output terminal.

3. The circuit of claim 2 wherein the second terminal of said first comparator is adapted to receive a negative voltage source.

4. The circuit of claim 2 wherein said logic module comprises:
    a flip-flop having an input terminal in electrical communication with said output terminal of said first comparator, a reset terminal in electrical communication with said first control input terminal, a data terminal adapted for receiving said first reference voltage, and an output terminal; and
    a NOR gate having a first NOR input terminal in electrical communication with said first control input terminal, a second NOR input terminal in electrical communication with said output terminal of said flip-flop, and an output terminal in electrical communication with said control output terminal.

5. The circuit of claim 1 wherein said pulse generator comprises:
    an adaptive pulse generator having an input terminal in electrical communication with said input terminal of said pulse generator and having an output terminal; and
    an OR gate having a first input terminal in electrical communication with said output terminal of said adaptive pulse generator, a second input terminal in electrical communication with said input terminal of said pulse generator, and an output terminal in electrical communication with said output terminal of said pulse generator.

6. The circuit of claim 5 wherein said pulse generator further comprises a comparator having a first terminal in electrical communication with said second terminal of said inductor, a second terminal adapted to receive a third reference voltage, and an output terminal in electrical communication with said input terminal of said adaptive pulse generator.

7. The circuit of claim 5 wherein said pulse generator further comprises an overcurrent detector having an input terminal in electrical communication with said first terminal of said inductor and an output terminal in electrical communication with said control terminal of said first switch.

8. A circuit for generating a regulated output voltage comprising:

an inductor having a first terminal and a second terminal;

a first switch having a first terminal adapted to receive a first reference voltage, a second terminal in electrical communication with said first terminal of said inductor, and a control terminal for receiving a first PFM control signal;

a second switch having a first terminal adapted to receive a second reference voltage, a second terminal in electrical communication with said first terminal of said inductor, and a control terminal for receiving a second control signal;

a pulse generator having an input terminal and an output terminal in electrical communication with said control terminal of said first switch, said pulse generator providing said first PFM control signal at said output terminal, said first PFM control signal utilizing pulses having a logical HIGH value for a predetermined duration and separated by a logical LOW value of varying duration;

a first comparator having a first terminal in electrical communication with said first terminal of said second switch, a second terminal in electrical communication with said second terminal of said second switch, and an output terminal; and a logic module having a first input terminal in electrical communication with said output terminal of said pulse generator, a second input terminal in electrical communication with said output terminal of said first comparator, and an output terminal in electrical communication with said control terminal of said second switch.

9. The circuit of claim 8 wherein said input terminal of said pulse generator is in electrical communication with said second terminal of said inductor through a voltage divider network.

10. The circuit of claim 9 wherein said voltage divider network comprises:

a first resistor having a first terminal electrically coupled to said second terminal of said inductor and a second terminal; and a second resistor having a first terminal electrically coupled to said second terminal of said first resistor and a second terminal adapted to receive said second reference voltage.

11. The circuit of claim 8 wherein said pulse generator further comprises an overcurrent detector having an input terminal in electrical communication with said first terminal of said inductor and an output terminal in electrical communication with said control terminal of said first switch.

12. A method for generating a regulated output voltage utilizing pulse frequency modulation comprising:

(a) applying a first reference voltage to a series combination of an inductor and a load for at least ,a predetermined time;

(b) applying a second reference voltage to the series combination of the inductor and the load when the voltage across the load exceeds a first predetermined voltage and the first reference voltage has been applied to the series combination of the inductor and the load for at least the predetermined time;

(c) repeating step (a) when the voltage across the load no longer exceeds the first predetermined voltage and (d) interrupting the application of the second reference voltage when a current through the inductor reverses direction.

13. The method of claim 12 further comprising terminating the application of the first reference voltage when a current through the inductor exceeds a predetermined current limit.

* * * * *